(12) United States Patent
Akiyama et al.

(10) Patent No.: US 9,229,251 B2
(45) Date of Patent: Jan. 5, 2016

(54) OPTICAL MODULATOR AND OPTICAL TRANSMITTER

(71) Applicant: FUJITSU LIMITED, Kawasaki-shi, Kanagawa (JP)

(72) Inventors: Suguru Akiyama, Tsukuba (JP); Takeshi Baba, Tsukuba (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 14/062,224

(22) Filed: Oct. 24, 2013

(65) Prior Publication Data
US 2014/0153859 A1 Jun. 5, 2014

(30) Foreign Application Priority Data

Nov. 30, 2012 (JP) ................................. 2012-262265

(51) Int. Cl.
*G02F 1/025* (2006.01)
*G02F 1/225* (2006.01)
(52) U.S. Cl.
CPC .............. *G02F 1/025* (2013.01); *G02F 1/2257* (2013.01)
(58) Field of Classification Search
None
See application file for complete search history.

(56) References Cited

U.S. PATENT DOCUMENTS

| 7,085,443 | B1 | 8/2006 | Gunn, III |
| 7,251,408 | B1 | 7/2007 | Gunn, III |
| 7,474,811 | B1 * | 1/2009 | Quitoriano et al. ............... 385/2 |
| 8,526,090 | B1 * | 9/2013 | Green et al. ................... 359/237 |
| 2008/0212913 | A1 * | 9/2008 | Gill et al. .......................... 385/2 |
| 2009/0263078 | A1 * | 10/2009 | Hosomi et al. .................. 385/14 |
| 2010/0247029 | A1 * | 9/2010 | Li et al. ........................... 385/14 |
| 2011/0007761 | A1 * | 1/2011 | Assefa et al. ................... 372/34 |
| 2011/0058764 | A1 * | 3/2011 | Kim et al. ......................... 385/2 |
| 2012/0195547 | A1 * | 8/2012 | Rasras ............................ 385/16 |

OTHER PUBLICATIONS

S. Akiyama, et al.; "12.5-Gb/s operation with 0.29-V-cm VpiL using silicon Mach-Zehnder modulator based-on forward-biased pin diode;" Optics Express; vol. 20; No. 3; Jan. 30, 2012; pp. 2911-2923 (13 Sheets)/Page 28 of specification.

* cited by examiner

*Primary Examiner* — Mike Stahl
(74) *Attorney, Agent, or Firm* — Kratz, Quintos & Hanson, LLP

(57) ABSTRACT

The present optical modulator includes an optical waveguide core made of a semiconductor material, an electrode, and a plurality of channels made of a semiconductor material doped in an n type or a p type and electrically connecting the optical waveguide core and the electrode to each other. The plurality of channels are provided in a spaced relationship from each other along a propagation direction of light; the optical waveguide core includes a doped region doped in the n type or the p type and a non-doped region. The doped region and the non-doped region are disposed alternately along the propagation direction of light. Each of the plurality of channels is connected to the doped region.

9 Claims, 10 Drawing Sheets

OPTICAL MODULATOR AND OPTICAL TRANSMITTER

CROSS-REFERENCE TO RELATED APPLICATION

This application is based upon and claims the benefit of priority of the prior Japanese Patent Application No. 2012-262265, filed on Nov. 30, 2012, the entire contents of which are incorporated herein by reference.

FIELD

The embodiments discussed herein are related to an optical modulator and an optical transmitter.

BACKGROUND

Conventionally, there is an optical modulator using a pn diode or a pin diode. Such an optical modulator as described includes an optical waveguide core including a pn junction portion or a pin junction portion, an electrode, and a channel that electrically connects the optical waveguide core and the electrode to each other. The optical modulator modulates light by changing an electric signal to be supplied from the electrode to the optical waveguide core through the channel.

As such an optical modulator as described above, for example, there are a rib waveguide type optical modulator that uses a pn diode, a side-wall grating waveguide type optical modulator that uses a pin diode and so forth.

Of such optical modulators, the rib waveguide type optical modulator that uses a pn diode includes a rib portion that functions as an optical waveguide core and a slab portion that functions as a channel. In the rib waveguide type optical modulator, light is confined in and propagates along the rib portion by a film thickness difference between the rib portion and the slab portion. In particular, in the rib waveguide type optical modulator, the slab portion is formed with a fixed thickness over the entire area thereof in the light propagation direction while the thickness thereof is formed smaller than that of the rib portion so that light is selectively confined in and propagates along the rib portion.

Meanwhile, the side-wall grating waveguide type optical modulator that uses a pin diode includes a grating provided partially along the light propagation direction on a side wall of the optical waveguide core, and the grating functions as a channel. In the side-wall grating waveguide type optical modulator, the region in which the grating is formed exhibits an average refractive index lower than that in the optical waveguide core so that light is confined in and propagates along the optical waveguide core. In other words, in the side-wall grating waveguide type optical modulator, the grating has a thickness equal to that of the optical waveguide core and is formed partially along the light propagation direction so that light is selectively confined in and propagates along the optical waveguide core.

SUMMARY

According to an aspect of the embodiment, an optical modulator includes an optical waveguide core made of a semiconductor material; an electrode; and a plurality of channels made of a semiconductor material doped in an n type or a p type and electrically connecting the optical waveguide core and the electrode to each other; wherein the plurality of channels are provided in a spaced relationship from each other along a propagation direction of light; the optical waveguide core includes a doped region doped in the n type or the p type and a non-doped region, the doped region and the non-doped region being disposed alternately along the propagation direction of light; and each of the plurality of channels is connected to the doped region.

According to another aspect of the embodiment, an optical transmitter includes a semiconductor laser that outputs continuous light; and an optical modulator that modulates the continuous light from the semiconductor laser; the optical modulator including an optical waveguide core made of a semiconductor material; an electrode; and a plurality of channels made of a semiconductor material doped in an n type or a p type and electrically connecting the optical waveguide core and the electrode to each other; the plurality of channels being provided in a spaced relationship from each other along a propagation direction of light; the optical waveguide core including a doped region doped in the n type or the p type and a non-doped region, the doped region and the non-doped region being disposed alternately along the propagation direction of light; and each of the plurality of channels being individually connected to the doped region; the plurality of channels being provided periodically in a fixedly spaced relationship from each other in the propagation direction of light; a wavelength of the continuous light outputted from the semiconductor laser being set to a wavelength in the proximity of a band edge on the longer wavelength side of a stop band of a transmission spectrum of the optical modulator.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A to 1O are schematic views depicting a configuration of an optical modulator (side-wall grating waveguide type optical modulator) according to an embodiment, and wherein FIG. 1A is a plan view, FIG. 1B a sectional view taken along line B-B' of FIG. 1A, and FIG. 1C a sectional view taken along line C-C' of FIG. 1A;

FIGS. 4A to 4M are schematic views illustrating a fabrication method of the optical modulator (Mach-Zehnder type optical modulator including the side-wall grating waveguide type optical modulator) according to the embodiment, and wherein FIG. 4A is a plan view, FIG. 4B a sectional view taken along line A-A' of FIG. 4A, FIG. 4C a plan view, FIG. 4D a sectional view taken along line A-A' of FIG. 4C, FIG. 4E a plan view, FIG. 4F a sectional view taken along line A-A' of FIG. 4E, FIG. 4G a sectional view taken along line B-B' of FIG. 4E, FIG. 4H a plan view, FIG. 4I a sectional view taken along line A-A' of FIG. 4H, FIG. 4J a sectional view taken along line B-B' of FIG. 4H, FIG. 4K a plan view, FIG. 4L a sectional view taken along line A-A' of FIG. 4K, and FIG. 4M a sectional view taken along line B-B' of FIG. 4K;

FIGS. 9A to 9C are schematic views depicting a configuration of an optical modulator (side-wall grating waveguide type optical modulator) according to a second modification to the embodiment, and wherein FIG. 9A is a plan view, FIG. 9B a sectional view taken along line B-B' of FIG. 9A, and FIG. 9C a sectional view taken along line C-C' of FIG. 9A.

DESCRIPTION OF EMBODIMENTS

Figure 2:
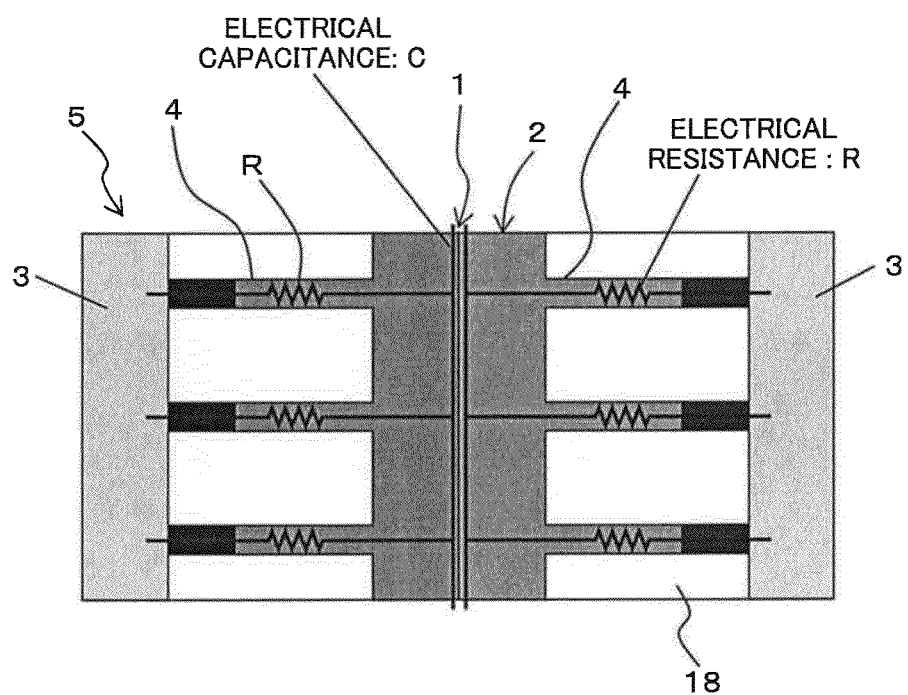
FIG. 2 is a schematic plan view depicting a configuration of an optical modulator (side-wall grating waveguide type optical modulator) of a comparative example.

Incidentally, it seems advisable to configure a side-wall grating waveguide type optical modulator using a pn diode, for example, as depicted in FIG. 2 wherein one side of the optical waveguide core is doped in the n type while the other side is doped in the p type like the above-described rib waveguide type optical modulator that uses a pn diode in order to make it possible to achieve operation of a higher speed than operation of the above-described side-wall grating waveguide type optical modulator that uses a pin diode.

However, if one side of the optical waveguide core is doped in the n type and the other side is doped in the p type, then the propagation loss of light when the light is confined in and propagates along the optical waveguide core increases.

Therefore, it is desirable to implement a side-wall grating waveguide type optical modulator which can operate at a higher speed while preventing increase of the propagation loss and an optical transmitter that includes the side-wall grating waveguide type optical modulator.

In the following, an optical modulator and an optical transmitter according to an embodiment are described with reference to FIGS. 1A to 7.

Figure 1A:
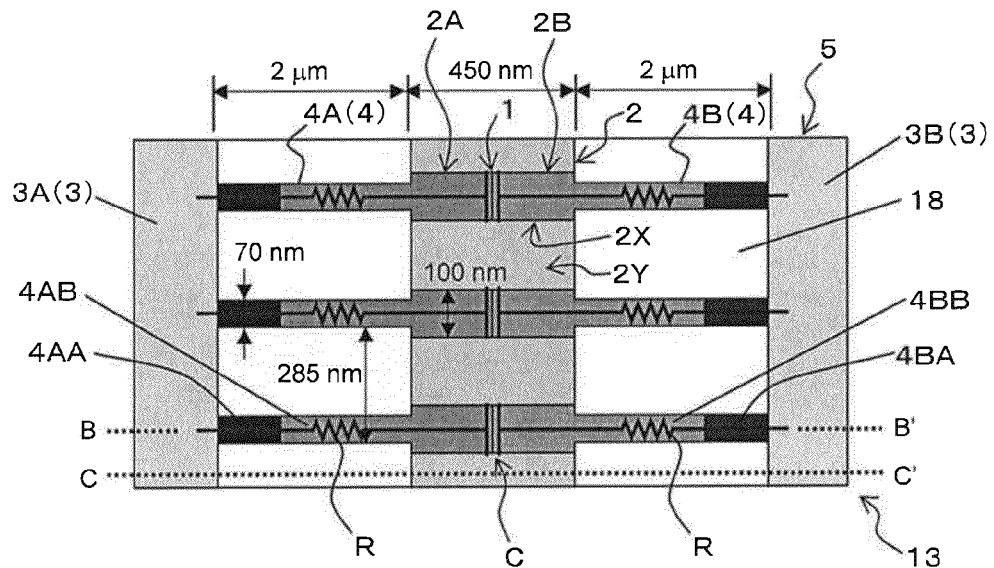
Figure 1B:
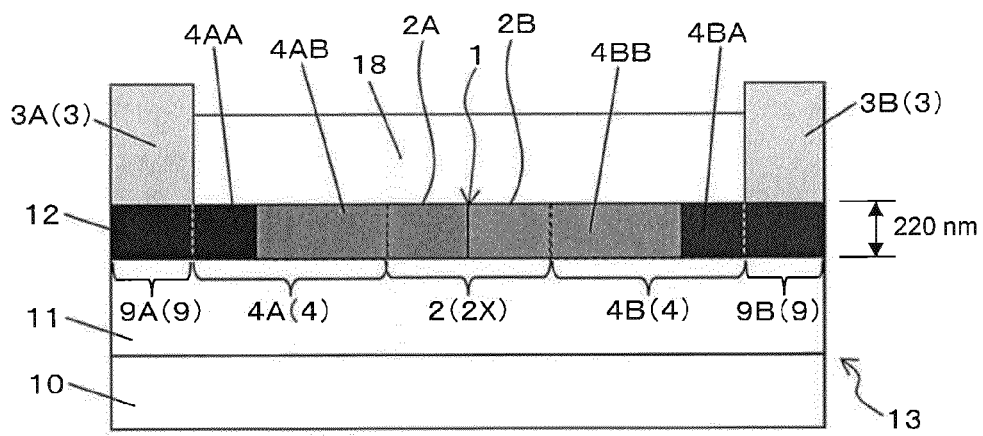
Figure 1C:
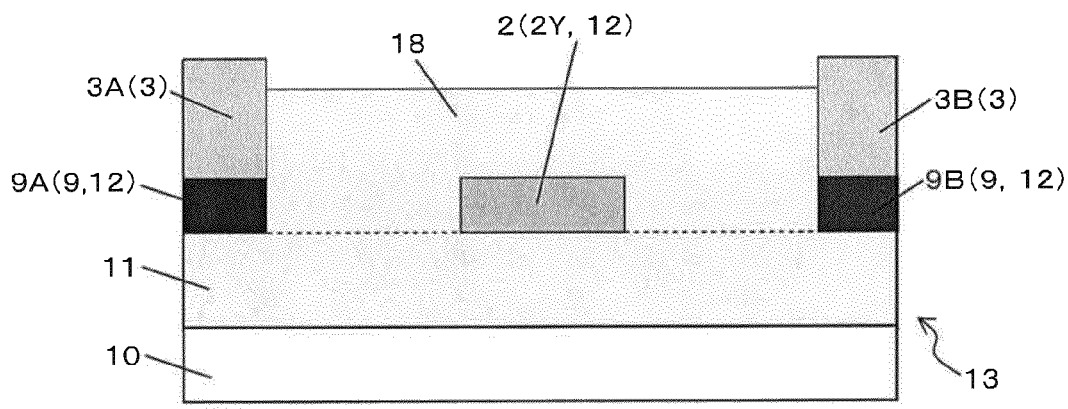

The optical modulator according to the embodiment is made of a semiconductor material and uses a pn diode. In particular, as depicted in FIGS. 1A to 1C, the optical modulator according to the embodiment includes an optical waveguide core 2 including pn junction portions 1, electrodes 3, and a plurality of channels 4 made of a semiconductor material doped in the n type or the p type and electrically connecting the optical waveguide core 2 and the electrodes 3 to each other. Here, the optical waveguide core 2 extends linearly, and the electrodes 3 are provided in parallel to the optical waveguide core 2. The optical modulator changes an electric signal to be supplied from the electrodes 3 to the optical waveguide core 2 through the channels 4 to modulate light. It is to be noted that the optical modulator 5 is referred to also as semiconductor optical modulator. Further, the optical waveguide core 2 is referred to also as optical waveguide core layer.

The optical modulator 5 is an optical modulator of the side-wall grating optical waveguide type and includes a plurality of gratings provided partially on side-wall of the optical waveguide core 2 along the propagation direction (advancing direction) of light and functioning as channels 4. In particular, the plurality of channels 4 are provided in a spaced relationship from each other along the propagation direction of light. Here, the plurality of channels 4, namely, the plurality of gratings, are disposed periodically in a fixedly spaced relationship from each other along the propagation direction of light. It is to be noted that the plurality of channels 4, namely, the plurality of gratings, may be provided non-periodically.

In the side-wall grating optical waveguide type optical modulator 5, the regions in which the gratings 4 are formed (here, the regions configured from the gratings and an oxide film because the gratings 4 are peripherally covered with the oxide film) is lower in average refractive index than the optical waveguide core 2. Consequently, light is confined in and propagates along the optical waveguide core 2. In other words, in the side-wall grating optical waveguide type optical modulator 5, the gratings 4 have a thickness equal to that of the optical waveguide core 2 and are formed partially along the propagation direction of light so that light is selectively confined in and propagates along the optical waveguide core 2.

In particular, in the embodiment, a first electrode 3A and a second electrode 3B provided on opposite sides of the optical waveguide core 2 are provided as the electrodes 3. The first electrode 3A and the second electrode 3B extend linearly and are provided in parallel to each other along the propagation direction of light and in parallel to the optical waveguide core 2. The first electrode 3A and the second electrode 3B are metal electrodes. The first electrode 3A is an n-side electrode while the second electrode 3B is a p-side electrode.

Further, in the embodiment, the optical waveguide core 2 has doped regions 2X doped in the n type or the p type and non-doped regions 2Y, and the doped regions 2X and the non-doped regions 2Y are disposed alternately along the propagation direction of light. The doped regions 2X include an n-type doped region 2A doped in the n type and a p-type doped region 2B joined to the n-type doped region 2A and doped in the p type. In particular, one of side wall sides of each doped region 2X extending from one side wall to the other side wall of the optical waveguide core 2 is set as the n-type doped region 2A while the other side wall side of the doped region 2X is set as the p-type doped region 2B. At or in the proximity of a central position in the widthwise direction of the optical waveguide core 2, the n-type doped region 2A and the p-type doped region 2B are joined together to form the pn junction portion 1. In other words, the optical waveguide core 2 includes the pn junction portion 1 at which the n-type doped region 2A and the p-type doped region 2B juxtaposed with each other along the direction (horizontal direction) perpendicular to the propagation direction of light are joined together. The pn junction plane of the pn junction portion 1 extends in the heightwise direction of the optical waveguide core 2 (direction perpendicular to the wafer plane). Further, the doped regions 2X are provided partially (here, periodically) in a fixedly spaced relationship from each other along the propagation direction of light. Here, the n-type doped region 2A provided on the one side wall side of the doped region 2X is provided partially (here, periodically) in a fixedly spaced relationship from each other along the propagation direction of light, and the p-type doped region 2B provided on the other side wall side of the doped region 2X is provided partially (here, periodically) in a fixedly spaced relationship from each other along the propagation direction of light. Therefore, in the embodiment, the n-type doped regions 2A and the non-doped regions 2Y are provided alternately along the propagation direction of light, and the p-type doped regions 2B and the non-doped regions 2Y are provided alternately along the propagation direction of light.

Further, in the embodiment, the plurality of channels 4 include a plurality of n-type channels 4A made of a semiconductor material doped in the n type and connecting to the n-type doped regions 2A, and a plurality of p-type channels 4B made of a semiconductor material doped in the p type and connecting to the p-type doped regions 2B. In other words, the channels 4A and 4B provided on opposite sides of the optical waveguide core 2 are doped in different polarities from each other. The plurality of n-type channels 4A electrically connect the optical waveguide core 2 and the first electrodes 3A and are provided in a spaced relationship from each other along the propagation direction of light. In the embodiment, the plurality of n-type channels 4A are provided periodically in a fixedly spaced relationship from each other along the propagation direction of light. Meanwhile, the plurality of p-type channels 4B electrically connect the optical waveguide core 2 and the second electrodes 3B to each other and are provided in a spaced relationship from each other along the propagation direction of light. In the embodiment, the plurality of p-type channels 4B are provided periodically in a fixedly spaced relationship from each other along the propagation direction of light.

It is to be noted that, although the plurality of channels 4 (namely, the plurality of n-type channels 4A and the plurality of p-type channels 4B) and the electrodes 3 (namely, the first electrode 3A and the second electrode 3B) here are provided on opposite sides of the optical waveguide core 2, the provision of them is not limited to this, but the plurality of channels 4 and the electrodes 3 may be provided only on at least one of the sides of the optical waveguide core 2. Further, while the positions of the plurality of channels 4 individually provided on opposite sides of the optical waveguide core 2, namely, the positions of the plurality of n-type channels 4A and the positions of the plurality of p-type channels 4B, are set to the same positions along the propagation direction of light, the arrangement of them is not limited to this, but the positions of them may be displaced from each other such that they are different from each other along the propagation direction of light.

Incidentally, it is necessitated for the optical modulator 5 to operate at a higher speed and over a wide band. The frequency response characteristic of the optical modulator depends upon the cutoff frequency $f_{3dB}$ $(2\pi RC)^{-1}$ and, in frequencies higher than the cutoff frequency $f_{3dB}$, the response of the optical modulator drops in proportion to the frequency. It is to be noted that, if a driving signal in which the frequency characteristic of the optical modulator is compensated for in advance such as, for example, a pre-emphasis signal is used, then a sufficient response is obtained also in frequencies higher than the cutoff frequency $f_{3dB}$, and this makes it possible for the optical modulator to operate at a higher speed and over a wide band.

Here, if the side-wall grating optical waveguide type optical modulator 5 is represented by an equivalent circuit, then each pn junction portion 1 included in the optical waveguide core 2 is represented as electrical capacitance C and each channel 4 and the portion of the optical waveguide core 2 between the channel 4 and the pn junction portion 1 are represented as electrical resistance R.

Thus, the modulation operation of the side-wall grating optical waveguide type optical modulator 5 is equivalent to increase or decrease of the charge to be accumulated in the electrical capacitance C by supplying current (high frequency current) to the electrical capacitance C through the electrical resistance R.

In this case, the modulation efficiency upon high-speed broadband operation (high frequency operation) of the side-wall grating optical waveguide type optical modulator 5 depends upon by how much carriers can be placed into and out of the electrical capacitance C when a modulation signal (high frequency modulation signal) is supplied (for example, when a fixed high-frequency voltage amplitude is applied). In other words, with the side-wall grating optical waveguide type optical modulator 5, greater modulation can be obtained and the modulation efficiency can be improved by increasing the charge amount to be placed into and out of the electrical capacitance C.

Further, in the side-wall grating optical waveguide type optical modulator 5, in high-frequency operation, namely, when the operating frequency (maximum operating frequency) f is higher than the cutoff frequency $f_{3dB}$ ($f > f_{3dB}$), the charge amount accumulated in the electrical capacitance C depends upon the magnitude of the electrical resistance value of the channel 4 and the portion of the optical waveguide core 2 between the channel 4 and the pn junction portion 1 represented as electrical resistance R. In particular, if the electrical resistance value of the channel 4 and the portion of the optical waveguide core 2 between the channel 4 and the pn junction portion 1 represented as electrical resistance R is decreased, then higher current can be supplied to the channel 4 and the portion of the optical waveguide core 2 between the channel 4 and the pn junction portion 1, and a corresponding greater amount of charge can be accumulated into the electrical capacitance C. In order to decrease the electrical resistance value of the channel 4 and the portion of the optical waveguide core 2 between the channel 4 and the pn junction portion 1 represented as electrical resistance R, the channel 4 and the portion of the optical waveguide core 2 between the channel 4 and the pn junction portion 1 may be doped in the n type or the p type.

It is to be noted that the electrical resistance value of the portion represented as electrical resistance R can be reduced by increasing the doping concentration. Further, while the channel 4 and the portion of the optical waveguide core 2 between the channel 4 and the pn junction portion 1 are taken into consideration as the electrical resistance R when charge is placed into and out of the optical waveguide core 2 here, in an actual driving system, it is preferable to additionally take also the load resistance of the power supply of the driving system into consideration.

In this manner, in the side-wall grating optical waveguide type optical modulator 5, when the operating frequency f is higher than the cutoff frequency $f_{3dB}$ ($f > f_{3dB}$), a greater amount of charge can be accumulated into the electrical capacitance C by doping the channel 4 and the portion of the optical waveguide core 2 between the channel 4 and the pn junction portion 1 in the n type or the p type to reduce the electrical resistance value of the channel 4 and the portion of the optical waveguide core 2 between the channel 4 and the pn junction portion 1. As a result, a greater amount of modulation can be obtained and the modulation efficiency can be improved.

However, if the optical waveguide core 2 is doped in the n type or the p type as depicted in FIG. 2, then the propagation loss experienced by light that is confined in and propagates along the optical waveguide core 2 increases.

Therefore, in the side-wall grating optical waveguide type optical modulator 5, the optical waveguide core 2 includes a doped regions 2X and a non-doped regions 2Y provided alternately along the propagation direction of light as depicted in FIGS. 1A to 1C. In particular, the optical waveguide core 2 includes a plurality of doped regions 2X provided in a spaced relationship from each other along the propagation direction of light, and a plurality of non-doped regions 2Y provided in a spaced relationship from each other along the propagation direction of light. The doping concentration of the optical waveguide core 2 is made non-uniform along the propagation direction of light in this manner. Here, the doped regions 2X and the non-doped regions 2Y extend over the entire length in the widthwise direction of the optical waveguide core 2. In other words, the doped regions 2X and the non-doped regions 2Y extend from one side wall to the other side wall of the optical waveguide core 2. Further, a plurality of channels 4, namely, a plurality of gratings, are connected to the doped regions 2X (namely, the plurality of doped regions 2X) of the optical waveguide core 2. Here, each doped region 2X of the optical waveguide core 2 includes a portion at which the channel 4 contacts with the optical waveguide core 2. Therefore, the doped region 2X of the optical waveguide core 2 is a region to opposite sides of which the channels 4 are connected, and the non-doped region 2Y of the optical waveguide core 2 is a region to opposite sides of which the channels 4 are not connected.

Thus, when the operating frequency f is higher than the cutoff frequency $f_{3dB}$ ($f>f_{3dB}$) improvement of the modulation efficiency can be implemented while increase of the propagation loss is prevented. In other words, reduction of the optical loss can be implemented while the modulation efficiency upon high speed operation is enhanced. In this manner, the side-wall grating optical waveguide type optical modulator 5 which can operate at a higher speed while it prevents increase of the propagation loss can be implemented.

Since the doped region which makes a main cause of the propagation loss in the optical waveguide core 2 on which the intensity of light is concentrated disappear partially, the propagation loss experienced by light propagating along the optical waveguide core 2 is reduced in comparison with that in an alternative case in which the optical waveguide core 2 is doped entirely (refer to, for example, FIG. 2). In this case, the pn junction portions 1 reduce and the electrical capacitance C of the optical modulator 5 drops in comparison with those in an alternative case in which the optical waveguide core 2 is doped entirely (refer to, for example, FIG. 2). However, where the operating frequency f is higher than the cutoff frequency $f_{3dB}$ ($f>f_{3dB}$), the modulation efficiency of the optical modulator depends not upon the electrical capacitance C but upon the electrical resistance R. Further, that the channel 4 and the portion of the optical waveguide core 2 between the channel 4 and the pn junction portion 1 are doped is same as that in the case in which the optical waveguide core 2 is doped entirely (refer to, for example, FIG. 2). Therefore, the electrical resistance R is equal to that in the case in which the optical waveguide core 2 is doped entirely (refer to, for example, FIG. 2). Accordingly, the modulation efficiency is equal to that in the case in which the optical waveguide core 2 is doped entirely (refer to, for example, FIG. 2). In this manner, the propagation loss can be reduced while an equal modulation efficiency is maintained in comparison with the alternative case in which the optical waveguide core 2 is doped entirely (refer to, for example, FIG. 2).

It is to be noted here that, while improvement of the modulation efficiency can be implemented while increase of the propagation loss is suppressed when the operating frequency f is higher than the cutoff frequency $f_{3dB}$ ($f>f_{3dB}$), such improvement of the modulation efficiency is not limited to this, but even when the operating frequency f is lower than the cutoff frequency $f_{3dB}$ ($f<f_{3dB}$), the effect that the propagation loss (optical loss) is reduced is achieved in comparison with the alternative case in which the optical waveguide core 2 is doped entirely (refer to, for example, FIG. 2). In other words, when the operating frequency f is lower than the cutoff frequency $f_{3dB}$ ($f<f_{3dB}$) the modulation efficiency depends upon the electrical capacitance C. Therefore, if the optical waveguide core 2 is doped partially as depicted in FIGS. 1A to 1C, then it is considered that, although the propagation loss can be reduced, also the electrical capacitance C of the optical modulator 5 drops and also the modulation efficiency drops together with the drop of the electrical capacitance C. However, a region, to opposite sides of which the channel 4 is not connected, of the optical waveguide core 2 is not doped. Even where the optical waveguide core 2 is doped entirely (refer to, for example, FIG. 2), it is considered that a region, to opposite sides of which the channel 4 is not connected, of the optical waveguide core 2 does not function very much as the electrical capacitance C. Therefore, the propagation loss can be reduced without a significant drop of the modulation efficiency in comparison with the alternative case in which the optical waveguide core 2 is doped entirely (refer to, for example, FIG. 2).

Especially, if only the regions in which the channels (gratings) are connected to opposite sides of the optical waveguide core 2 are selectively doped in the side-wall grating optical waveguide type optical modulator 5 as described hereinabove, then the electrical capacitance C of the optical modulator 5 drops. In this case, the width of the doped regions 2X, namely, the length of the doped regions 2X in the direction along the propagation direction of light, may be determined so that the electrical capacitance C drops within a range within which the condition ($f>f_{3dB}$) that the operating frequency (maximum operation frequency) f of the optical modulator 5 is higher than the cutoff frequency (3 dB band) $f_{3dB}=(2\pi RC)^{-1}$ that depends upon the electrical resistance R and the electrical capacitance C is satisfied.

In other words, although, where the optical waveguide core 2 is doped partially, the electrical capacitance C of the optical modulator 5 drops, the width of the doped regions 2X of the optical waveguide core 2 is preferably determined so that the width thereof does not become too small in order to prevent the electrical capacitance C from dropping too much.

On the other hand, where a fabrication method hereinafter described (refer to FIGS. 4A to 4M) is used for fabrication, the width of the doped region 2X of the optical waveguide core 2 becomes a little greater than the width (grating width) of the channel 4. Here, while the width of the channel 4 is approximately 70 nm, the width of the doped region 2X of the optical waveguide core 2 is approximately 100 nm. In other words, in the fabrication method hereinafter described (refer to FIGS. 4A to 4M), after partial doping into the optical waveguide core 2 is carried out, etching is carried out so that the channels (gratings) 4 may be left in accordance with the doped regions 2X. Therefore, a margin for alignment is provided on opposite sides of the doped regions 2X of the optical waveguide core 2 by making the width of the doped regions 2X of the optical waveguide core 2 a little greater than the width of the channels 4 in advance so that the positions of the channels 4 to be left by the etching may coincide with them. In this case, the width of the doped regions 2X of the optical waveguide core 2 becomes a little greater than the width of the channel 4.

If those points are taken into consideration, then where an error in alignment upon fabrication is negligible, it is preferable to make the width of the doped regions 2X of the optical waveguide core 2 equal to the width of the channels 4, but where an error that is not negligible occurs, it is preferable to make the width of the doped regions 2X of the optical waveguide core 2 greater than the width of the channels 4 in accordance with the error. It is to be noted that, if the electrical capacitance C becomes too low in the fabricated side-wall grating optical waveguide type optical modulator 5, then it is possible to increase the electrical capacitance C so as to satisfy $f > f_{3dB}$ by applying a bias voltage in the forward direction to the diode (pn junction portion 1) included in the optical waveguide core 2.

In the following, a case in which the side-wall grating optical waveguide type optical modulator 5 described above is used as a phase modulator provided in a Mach-Zehnder type optical modulator 6 and silicon is used as a semiconductor material that configures the phase modulator is taken as an example and described particularly with reference to FIGS. 1A to 1C and 3. It is to be noted that FIG. 1A is an enlarged view of a region X surrounded by a broken line in FIG. 3, namely, an enlarged view of a phase modulator portion of the Mach-Zehnder type optical modulator 6.

Figure 3:
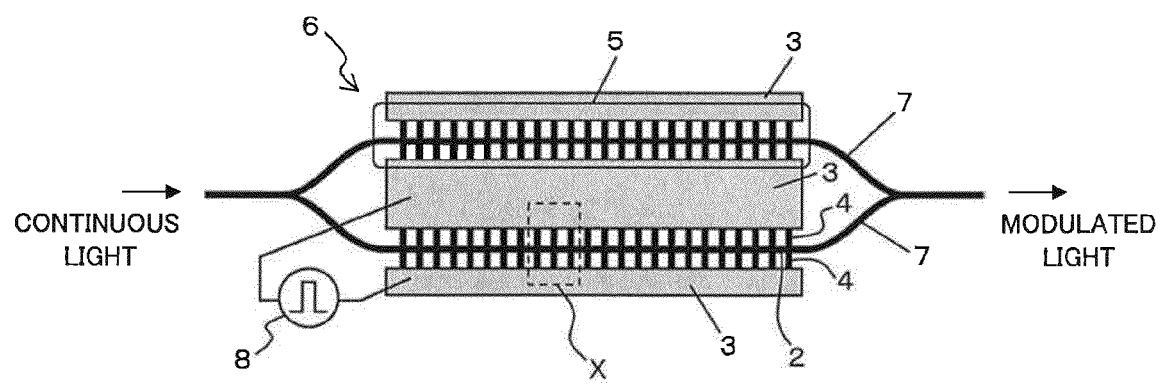
FIG. 3 is a schematic plan view depicting a configuration of an optical modulator (Mach-Zehnder type optical modulator) according to the embodiment.
Figure 4:
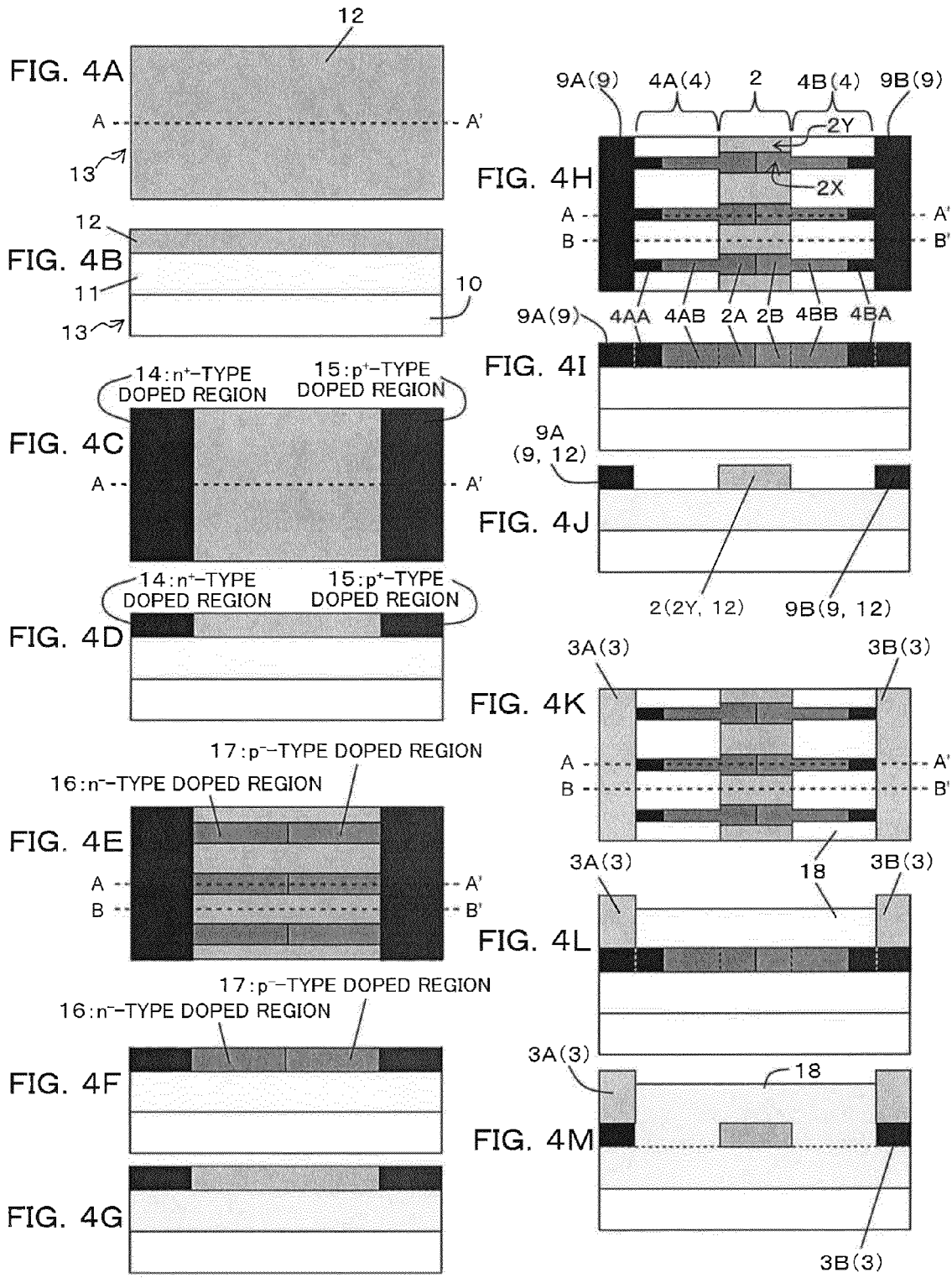
Figure 5:
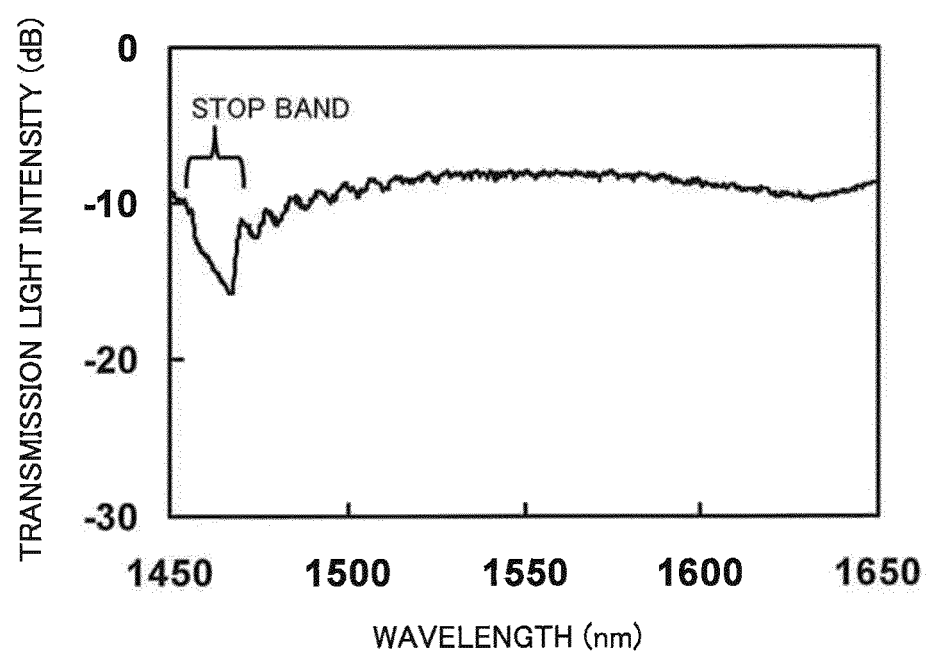
FIG. 5 is a view illustrating a transmission spectrum of the optical modulator (side-wall grating waveguide type optical modulator) according to the embodiment.

The Mach-Zehnder type optical modulator 6 includes two arms 7 as illustrated in FIG. 3 and includes, as a phase modulator, the side-wall grating optical waveguide type optical modulator 5 described hereinabove on each of the two arms 7. Continuous light inputted from one side of the Mach-Zehnder type optical modulator 6 is outputted as modulated light from the other side of the Mach-Zehnder type optical modulator 6. Here, in the above-described side-wall grating optical waveguide type optical modulator 5 provided on each of the two arms 7, one of the electrodes 3 is used as a common electrode. Further, a voltage signal source 8 is connected to the electrode 3 provided on the side-wall grating optical waveguide type optical modulator 5 described hereinabove provided on one of the two arms 7 such that a high frequency voltage is applied as a modulation signal. It is to be noted that the phase modulator is referred to also as phase modulation device. Further, the side-wall grating optical waveguide type optical modulator 5 is referred to also as side-wall grating optical waveguide type optical modulation device. The voltage signal source 8 may otherwise be connected to each of the electrodes 3 provided on the above-described side-wall grating optical waveguide type optical modulator 5 provided on each of the two arms 7 such that a high frequency voltage is applied as a modulation signal.

In this case, in the above-described side-wall grating optical waveguide type optical modulator 5 used as a phase modulator, the voltage to be applied from the electrodes 3 to the optical waveguide core 2 through the plurality of channels 4 is varied. Consequently, the concentration of free carriers of electrons and holes of the pn junction portion 1 are varied to vary the refractive index of the optical waveguide core 2 by a free carrier plasma effect thereby to modulate the phase of light confined in and propagating along the optical waveguide core 2. In this case, since the region in which the carrier concentration varies is a region in the proximity of the pn junction portion 1 (pn junction plane), it is possible to raise the modulation efficiency by increasing the spatial overlap between the pn junction portion 1 and the intensity distribution of propagation light.

Here, in the Mach-Zehnder type optical modulator 6, the two arms 7 (refer to FIG. 3) and the optical waveguide core 2, channels (gratings) 4 and pads 9 provided on the above-described side-wall grating optical waveguide type optical modulator 5 are formed by using a SOI substrate 13 wherein a buried oxide (BOX) layer 11 of a thickness of approximately 2 μm and a crystal silicon (SOI; silicon on insulator) layer 12 of another film thickness of approximately 220 nm are formed on a silicon substrate 10 as depicted in FIGS. 1A to 1C, doping the SOI layer (silicon layer) 12 partially in the n type or the p type and then etching to pattern the SOI layer 12. Specifically, the optical waveguide core 2 is doped partially along the propagation direction of light. In particular, the optical waveguide core 2 has a doped region 2X and a non-doped region 2Y provided alternately along the propagation direction of light. Here, a region in which the channels 4 are connected to opposite sides of the optical waveguide core 2 is set as the doped region 2X while another region in which the channels 4 are not connected to opposite sides of the optical waveguide core 2 is set as the non-doped region 2Y. Further, the pads 9 are provided in parallel to the optical waveguide core 2 on opposite sides of the optical waveguide core 2. Here, a first pad 9A is provided on one side of the optical waveguide core 2 while a second pad 9B is provided on the other side of the optical waveguide core 2. The plurality of channels (gratings) 4 are provided periodically in a spaced relationship from each other between the optical waveguide core 2 and the pads 9. In particular, the plurality of channels (gratings) 4 are formed on opposite sides of the optical waveguide core 2 such that they extend from the side walls of the optical waveguide core 2 on the inner side to the side walls of the pads 9 on the outer side in a direction perpendicular to the direction in which the optical waveguide core 2 extends. The electrodes 3 made of a metal such as, for example, aluminum are provided immediately above the pads 9.

The two arms 7 (refer to FIG. 3) and the optical waveguide core 2 provided on the above-described side-wall grating optical waveguide type optical modulator 5 are made of silicon. In other words, the two arms 7 (refer to FIG. 3) and the optical waveguide core 2 provided on the above-described side-wall grating optical waveguide type optical modulator 5 are silicon waveguide cores. Specifically, the silicon from which the optical waveguide core 2 is configured is doped, on one side of the region on opposite sides of which the channels 4 are connected, in the n type, and on the other side, in the p type, but the region of the optical waveguide core 2 to opposite sides of which no channel 4 is connected is not doped. Further, the two arms 7 (refer to FIG. 3) and the optical waveguide core 2 provided on the side-wall grating optical waveguide type optical modulator 5 described hereinabove have a width of approximately 450 nm and a thickness of approximately 220 nm. Further, the width of the doped regions 2X of the optical waveguide core 2 is approximately 100 nm and greater than the width of the channels 4 described hereinbelow. In other words, the doped regions 2X of the optical waveguide core 2 have a center position (center position in the propagation direction of light) coincident with the center position (center position in the widthwise direction) of the channels 4 connected to opposite sides thereof and have a width of approximately 100 nm, which is greater than the width of the channels 4 hereinafter described.

Further, the plurality of channels 4 provided on the above-described side-wall grating optical waveguide type optical modulator 5 and the pads 9 on opposite sides are made of silicon doped in the n type or the p type. In particular, those of the plurality of channels 4 and the pads 9 on opposite sides, which are provided on the one side, are doped in the n type, and those provided on the other side are doped in the p type. Further, the width of each of the channels 4 is approximately 70 nm. Further, the length of each of the channels 4, namely, the length of the channels 4 in the direction perpendicular to the direction in which the optical waveguide core 2 extends (propagation direction of light) is approximately 2 μm. Further, the period of the plurality of channels 4 is approximately 285 nm. Furthermore, the thickness of the channels 4 is approximately 220 nm and is equal to the thickness of the optical waveguide core 2.

Here, the pads 9 and the regions (outer side regions) 4AA and 4BA of the channels 4 on the pads 9 side are doped in the n type or the p type in a higher concentration than the regions (inner side regions) 4AB and 4BB of the channels 4A and 4B on the optical waveguide core 2 side and the doped region 2X (2A, 2B) of the optical waveguide core 2. For example, the pads 9 and the regions 4AA and 4BA of the channels 4 on the pads 9 side are high concentration doped regions of a doping concentration of approximately $10^{20}/cm^3$, and the regions 4AB and 4BB of the channel 4 on the optical waveguide core 2 side and the doped region 2X (2A, 2B) of the optical waveguide core 2 are low concentration doped regions of another doping concentration of approximately $5 \times 10^{18}/cm^3$. In particular, the pad 9A on the one side and the region 4AA of each channel 4 on the pad 9A side are doped in the n type in a high doping concentration of approximately $10^{20}/cm^3$ while the pad 9B on the other side and the region 4BA of each channel 4B on the pad 9B side are doped in the p type in a high doping concentration of $10^{20}/cm^3$. On the other hand, the region 4AB of the channel 4 on the optical waveguide core 2 side and the doped region 2A of the optical waveguide core 2 on the one side are doped in the n type in a low doping concentration of approximately $5 \times 10^{18}/cm^3$, and the region 4BB of the channel 4B on the optical waveguide core 2 side and the doped region 2B of the optical waveguide core 2 on the other side are doped in the p type in a low doping concentration of approximately $5 \times 10^{18}/cm^3$. It is to be noted that a region doped in the n type in a high concentration is referred to as $n^+$ type doped region and a region doped in the n type in a low concentration is referred to as $n^-$ type doped region while a region doped in the p type in a high concentration is referred to as $p^+$ type doped region and a region doped in the p type in a low concentration is referred to as $p^-$ type doped region.

The two arms 7 (refer to FIG. 3) and the optical waveguide core 2 and the plurality of channels 4 provided on the side-wall grating optical waveguide type optical modulator 5 described hereinabove are peripherally covered with a $SiO_2$ film (silicon oxide film; oxide film, overclad oxide film) 18 which functions as a clad.

Now, a fabrication method of the Mach-Zehnder type optical modulator 6 is described about a region of the side-wall grating optical waveguide type optical modulator 5 described hereinabove with reference to FIGS. 4A to 4M.

First, a SOI substrate (wafer) 13 wherein a buried oxide (BOX) layer 11 of a thickness of approximately 2 µm and a crystal silicon (SOI) layer 12 of a film thickness of approximately 220 nm are formed on a silicon substrate 10 as depicted in FIGS. 4A and 4B is prepared.

Then, regions that are to form the pads 9 of the SOI layer (silicon layer) 12 and regions that are to form the regions 4AA and 4BA of each channel 4 on the pad 9 side are doped in a high concentration in the n type or the p type as depicted in FIGS. 4C and 4D using, for example, a lithography technique and an ion implantation technique. Here, the region that is to form the pad 9A on the one side and the regions that are to form the regions 4AA of the channels 4A on the pad 9A side are doped in the n type in a high doping concentration of approximately $10^{20}/cm^3$, and the region that is to form the pad 9B on the other side and the regions that are to form the regions 4BA of the channels 4B on the pad 9B side are doped in the p type in a high doping concentration of approximately $10^{20}/cm^3$. It is to be noted that, in FIGS. 4C and 4D, a region doped in the n type in a high concentration is represented as n' type doped region 14 while a region doped in the p type in a high concentration is represented as $p^+$ type doped region 15.

Then, regions that are to form the regions 4AB and 4BB of the channels 4 of the SOI layer 12 on the optical waveguide core 2 side and regions that are to form the doped regions 2X (2A, 2B) of the optical waveguide core 2 are doped in the n type or the p type in a low concentration as depicted in FIGS. 4E to 4G using, for example, a lithography technique and an ion implantation technique. Here, the regions that are to form the region 4AB of the channels 4A on the optical waveguide core 2 side and the regions that are to form the doped regions 2A of the optical waveguide core 2 on the one side are doped in the n type in a low doping concentration of approximately $5 \times 10^{18}/cm^3$, and the regions that are to form the region 4BB of the channels 4B on the optical waveguide core 2 side and the regions that are to form the doped regions 2B of the optical waveguide core 2 on the other side are doped in the p type in a low doping concentration of approximately $5 \times 10^{18}/cm^3$. In this manner, the region that is to form the optical waveguide core 2 is partially doped in the n type or the p type along the propagation direction of light (waveguide direction) together with the regions that are to form the channels 4. In other words, the region that is to form the optical waveguide core 2 is partially doped, in a region on an extension line of the region that is to form each channel 4, in the n type or the p type. It is to be noted that, in FIGS. 4E to 4G, the region doped in the n type in a low concentration is represented as $n^-$ doped region 16 while the region doped in the p type in a low concentration is represented as $p^-$ doped region 17.

Here, taking a margin for alignment among the position of a p-type doped region forming mask formed using a lithography technique upon doping in the p type, the position of an n-type doped region forming mask formed using a lithography upon doping in the n type and the position of a side-wall grating forming mask (channel forming mask) formed using a lithography technique upon etching hereinafter described into consideration, the region of a width of approximately 100 nm is doped as the region that is to form each channel 4 and the regions that are to form the doped regions 2X (2A, 2B) of the optical waveguide core 2. It is to be noted that, if there is no necessity to take the margin for alignment into consideration, then the region of a width of approximately 70 nm may be doped.

Then, an unnecessary portion of the SOI layer 12 is removed completely as depicted in FIGS. 4H to 4J using, for example, a lithography technique and a dry etching technique. Consequently, the two arms 7 (refer to FIG. 3) that configure the Mach-Zehnder type optical modulator 6, the pads 9 (9A, 9B) that configure the side-wall grating optical waveguide type optical modulator 5, the channels 4 (4A, 4B) and the optical waveguide core 2 are formed from the remaining SOI layer 12, namely, from the SOI layer 12 doped partially in the n type or the p type.

Especially, the optical waveguide core 2 doped partially along the propagation direction of light is formed. Here, the optical waveguide core 2, wherein the doped regions 2X having the n-type doped regions 2A doped in the n type in a low concentration on the one side of the regions to opposite sides of which the channels 4A and 4B are connected and the p-type doped region 2B doped in the p type in a low concentration on the other side of the regions, and the non-doped regions 2Y having none of the channels 4A and 4B connected to opposite sides thereof and not doped in the n type or the p type are provided alternately along the propagation direction of light, is formed. The width of the doped regions 2X of the optical waveguide core 2 is approximately 100 nm and is greater than the width (approximately 70 nm) of the channels 4 (refer to FIG. 1A).

Further, the channels 4 are formed with a width of approximately 70 nm and a length of approximately 2 μm (refer to FIG. 1A). Further, the plurality of channels 4 are formed such that they have a period of approximately 285 nm (refer to FIG. 1A). Further, the plurality of channels 4A formed on the one side are formed such that they include a region 4AA doped in the n type in a high concentration and a region 4AB doped in the n type in a low concentration. Further, the plurality of channels 4B formed on the other side are formed such that they include a region 4BA doped in the p type in a high concentration and a region 4BB doped in the p type in a low concentration.

Further, a pad 9A doped in the n type in a high concentration is formed on the one side, and a pad 9B doped in the p type in a high concentration are formed on the other side.

Further, the thickness of the optical waveguide core 2 and the thickness of the channels 4 are equal to each other and are approximately 220 nm. Meanwhile, the two arms 7 (refer to FIG. 3) and the optical waveguide core 2 are formed with a width of approximately 450 nm (refer to FIG. 1A).

Then, the intermediate product is entirely covered with a $SiO_2$ film 18 of, for example, approximately 1 μm as depicted in FIGS. 4K to 4M. Consequently, the two arms 7 (refer to FIG. 3), the optical waveguide core 2 and the plurality of channels 4 are peripherally covered with the $SiO_2$ film 18.

Thereafter, the $SiO_2$ film 18 just on the pads 9 is removed and electrodes 3 made of a metal such as, for example, aluminum are formed. Here, the first electrode 3A is formed on the first pad 9A provided on the one side, and the second electrode 3B is formed on the second pad 9B provided on the other side.

The Mach-Zehnder type optical modulator 6 including the above-described side-wall grating optical waveguide type optical modulator 5 as a phase modulator can be fabricated in such a manner as described above.

In order to cause such a Mach-Zehnder type optical modulator 6 as described above to operate, namely, in order to cause the side-wall grating optical waveguide type optical modulator 5 included in the Mach-Zehnder type optical modulator 6 to operate, a voltage of +0.8 V is applied as a DC bias voltage upon operation in the forward direction to the pn junction portions 1. In this case, since the electrical capacitance C of the side-wall grating optical waveguide type optical modulator 5 becomes very great, the cutoff frequency $f_{3dB}$ normally becomes a low frequency of approximately 100 MHz. Thus, the side-wall grating optical waveguide type optical modulator 5 carries out high speed broadband operation (maximum operating frequency f=approximately 12.5 GHz) at approximately 12.5 Gb/s or more. In particular, in the side-wall grating optical waveguide type optical modulator 5, a driving signal that compensates for a frequency characteristic of the optical modulator in advance such as a pre-emphasis signal (refer to, for example, S. Akiyama et al., "12.5-Gb/s operation with 0.29-V·cm VπL using silicon Mach-Zehnder modulator based-on forward-biased pin diode", Optics Express, Vol. 20, No. 3, pp. 2911-2923 (2012)) is used to perform driving by an operation frequency higher than the cutoff frequency $f_{3dB}$ thereby to make high speed broadband operation possible.

Now, an operating frequency of the above-described side-wall grating optical waveguide type optical modulator 5 is described.

Figure 6:
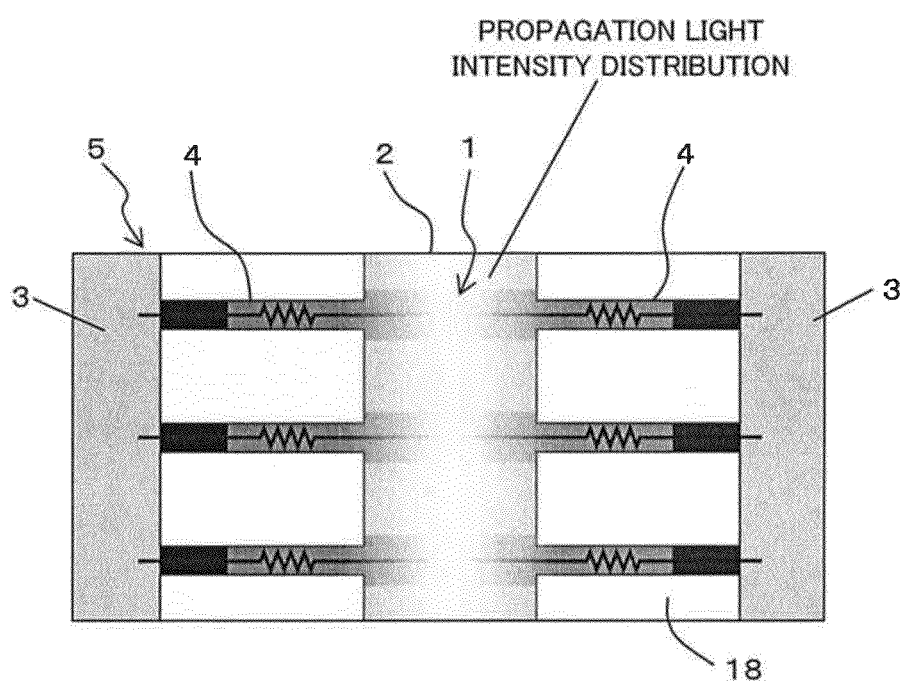
FIG. 6 is a view illustrating an intensity distribution of propagation light when the operating wavelength is set to a wavelength of approximately 1,550 nm included in a transmission wavelength band of the transmission spectrum of the optical modulator (side-wall grating waveguide type optical modulator) according to the embodiment.

The stop band in a transmission spectrum of the above-described side-wall grating optical waveguide type optical modulator 5 depends upon the period of the channels (gratings) 4. In the above-described side-wall grating optical waveguide type optical modulator 5, the channels (gratings) 4 are provided periodically in a period of approximately 285 nm. Therefore, in the transmission spectrum of the side-wall grating optical waveguide type described hereinabove, a stop band (reflection wavelength band) arising from the side-wall grating structure thereof can be seen in frequencies in the proximity of approximately 1,470 nm. On the other hand, in wavelengths on the longer wavelength side than the stop band, namely, in the transmission wavelength band other than the stop band, a comparatively flat transmission characteristic is obtained. Therefore, a wavelength included in the transmission wavelength band within which the transmission characteristic is comparatively flat may be used as the operating wavelength. For example, the operating wavelength of the side-wall grating optical waveguide type optical modulator 5 described hereinabove may be set to approximately 1,550 nm. Here, in order to set the operating frequency to approximately 1,550 nm, the wavelength (input wavelength) of continuous light to be inputted to the side-wall grating optical waveguide type optical modulator 5 may be set to approximately 1,550 nm. For example, in an optical transmitter including a semiconductor laser that outputs continuous light and the optical modulator 5 that modulates the continuous light from the semiconductor laser, the wavelength of the continuous light to be outputted from the semiconductor laser may be set to approximately 1,550 nm. Where a wavelength included in the transmission wavelength band is set as the operating wavelength in this manner, the intensity distribution of propagation light that propagates along the optical waveguide core 2 of the above-described side-wall grating optical waveguide type optical modulator 5 becomes substantially uniform in the propagation direction as depicted in FIG. 6.

Figure 7:
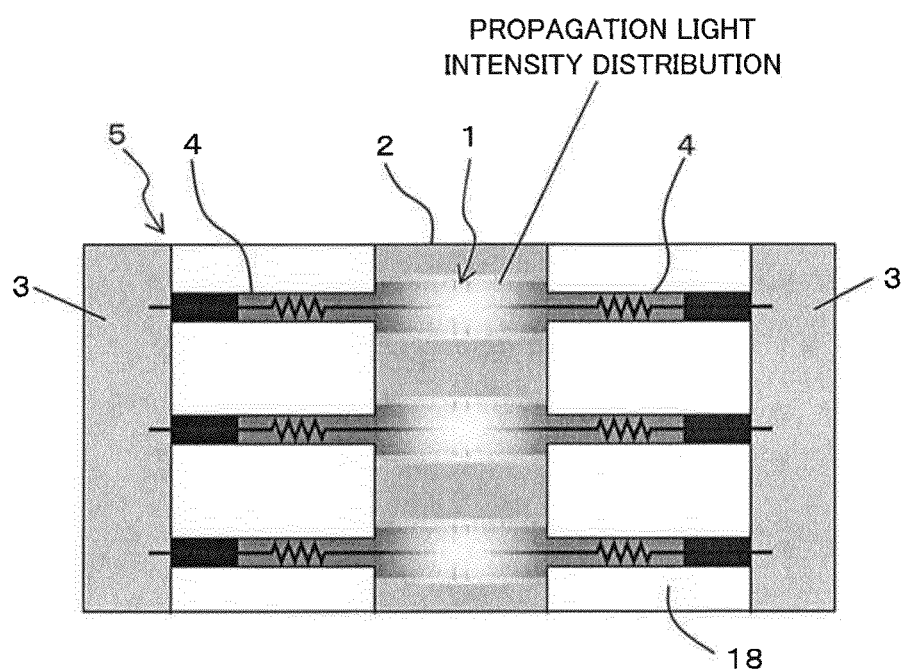
FIG. 7 is a view illustrating an intensity distribution of propagation light when the operating wavelength is set to a wavelength of approximately 1,470 nm in the proximity of a band edge on the long wavelength side of a stop band of the transmission spectrum of the optical modulator (side-wall grating waveguide type optical modulator) according to the embodiment.

On the other hand, the modulation efficiency can be improved further by setting the operating wavelength of the above-described side-wall grating optical waveguide type optical modulator 5 to a wavelength in the proximity of a band edge on the longer wavelength side of the stop band of the transmission spectrum of the side-wall grating optical waveguide type optical modulator 5. In the above-described side-wall grating optical waveguide type optical modulator 5, the channels (gratings) 4 are provided periodically in a period of approximately 285 nm, and the wavelength in the proximity of the band edge on the longer wavelength side of the stop band is approximately 1,470 nm. Therefore, by setting the operating wavelength to approximately 1,470 nm, the intensity distribution of propagation light that propagates along the optical waveguide core 2 of the above-described side-wall grating optical waveguide type optical modulator 5 is concentrated upon a region in which the channels (gratings) 4 are connected in the propagation direction of light as depicted in FIG. 7. This intensity distribution of propagation light coincides with a distribution in a region of the side-wall grating optical waveguide type optical modulator 5 in which charge varies at a high speed, namely, in a region in which the pn junction portions 1 in the optical waveguide core 2 are formed. Therefore, a variation of the charge amount in the optical waveguide core 2 comes to contribute more effectively to phase modulation of propagation light. In other words, in the side-wall grating optical waveguide type optical modulator 5, an effect that an efficiency of the modulator is enhanced with respect to a fixed voltage variation applied to the modulator is obtained. Here, in order to set the operating frequency to a wavelength in the proximity of the band edge on the longer wavelength side of the stop band described hereinabove, here, to approximately 1,470 nm, the wavelength of continuous light to be inputted to the side-wall grating optical waveguide type optical modulator 5 may be set to approximately 1,470 nm. For example, in an optical transmitter including a semiconductor laser that outputs continuous light and the optical modulator 5 which modulates the continuous light from the semiconductor laser, the wavelength of the continuous light to be outputted from the semiconductor laser may be set to approximately 1,470 nm. It is to be noted that, by changing the period of channels (gratings) 4 on the above-described side-wall grating optical waveguide type optical modulator 5, also it is possible to make the wavelength in the proximity of the band edge on the longer wavelength side of the stop band described hereinabove equal to approximately 1,550 nm that is an operating wavelength, which is popular in optical communication.

Accordingly, the optical modulator and the optical transmitter according to the embodiment exhibit an advantage that a side-wall grating waveguide type optical modulator which can operate at a higher speed and an optical transmitter that includes the side-wall grating waveguide type optical modulator can be implemented while the propagation loss is prevented from increasing.

It is to be noted that the present invention is not limited to the configuration described in connection with the embodiment described above but can be modified in various manners without departing from the spirit and the scope of the present invention.

For example, while, in the embodiment described above, the n-type doped region 2A and the non-doped region 2Y are provided alternately along the propagation direction of light and the p-type doped region 2B and the non-doped region 2Y are provided alternately along the propagation direction of light, the provision of such regions is not limited to this. In particular, at least one of the n-type doped region 2A and the p-type doped region 2B and the non-doped region 2Y may be provided alternately along the propagation direction of light.

Figure 8:
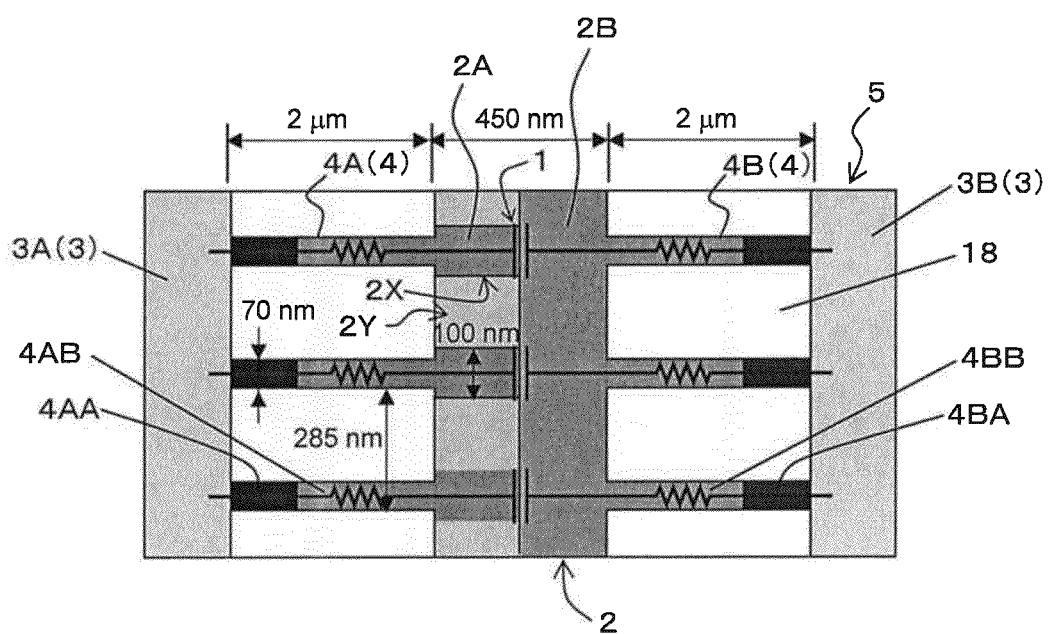
FIG. 8 is a schematic plan view depicting a configuration of an optical modulator (side-wall grating waveguide type optical modulator) according to a first modification to the embodiment.

For example, the n-type doped region 2A and the non-doped region 2Y may be provided alternately along the propagation direction of light while the p-type doped region 2B is provided continuously in the propagation direction of light as depicted in FIG. 8. In particular, the n-type doped region 2A provided on the one side wall side of the doped region 2X may be provided partially (here, periodically) in a fixedly spaced relationship along the propagation direction of light while the p-type doped region 2B provided on the other side wall side is provided entirely (namely, uniformly; equally) along the propagation direction of light. Also in this case, the doped region 2X includes the n-type doped region 2A doped in the n type and the p-type doped region 2B joined to the n-type doped region 2A and doped in the p type. Further, the one side wall side of the optical waveguide core 2 is set as the n-type doped region 2A and the other side wall side is set as the p-type doped region 2B. Further, at or in the proximity of a central position of the optical waveguide core 2 in the widthwise direction, the n-type doped region 2A and the p-type doped region 2B are joined together to form the pn junction portion 1. It is to be noted that this is referred to as first modification. With such a configuration of the first modification as described above, the propagation loss can be reduced while an equal modulation efficiency is maintained in comparison with the alternative case in which the optical waveguide core 2 is doped entirely (for example, refer to FIG. 2). Further, since the p-type doped region 2B is provided entirely in the propagation direction of light, the first modification exhibits an advantage that the fabrication process is facilitated in comparison with the embodiment described hereinabove (refer to FIG. 1A). In particular, in the side-wall grating waveguide type optical modulator and the optical transmitter of the embodiment described hereinabove (refer to FIG. 1A), alignment of the position of a p-type doped region forming mask formed using a lithography technique upon doping in the p type, the position of an n-type doped region forming mask formed using a lithography technique upon doping in the n type and the position of a side-wall grating forming mask (channel forming mask) formed using a lithography technique upon etching hereinafter described are performed with high accuracy in the fabrication process. In contrast, in the side-wall grating waveguide type optical modulator and the optical transmitter of the first modification (refer to FIG. 8), since the p-type doped region 2B is provided entirely in the propagation direction of light, alignment of the position of an n-type doped region forming mask formed using a lithography technique upon doping in the n type and the position of a side-wall grating forming mask formed using a lithography technique upon etching hereinafter described (principally, alignment in a direction along the propagation direction of light) may be performed with high accuracy in the fabrication process. Therefore, the side-wall grating waveguide type optical modulator and the optical transmitter of the first modification exhibit an advantage that the fabrication process is facilitated in comparison with those of the embodiment described hereinabove.

Alternatively, the p-type doped region 2B and the non-doped region 2Y may be provided alternately along the propagation direction of light while the n-type doped region 2A is provided continuously along the propagation direction of light. In other words, the n-type doped region 2A provided on the one side wall side of the doped region 2X may be provided entirely (namely, uniformly; equally) along the propagation direction of light while the p-type doped region 2B provided on the other side wall side is provided partially (here, periodically) in a fixedly spaced relationship in the propagation direction of light. Also in this case, the doped region 2X includes the n-type doped region 2A doped in the n type and the p-type doped region 2B joined to the n-type doped region 2A and doped in the p type. Further, the one side wall side of the optical waveguide core 2 is set the n-type doped region 2A while the other side wall side is set as the p-type doped region 2B. With such a configuration as described above, the propagation loss can be reduced while an equal modulation efficiency is maintained in comparison with the alternative case in which the optical waveguide core 2 is doped entirely (refer to, for example, FIG. 2). Further, since the n-type doped region 2A is provided entirely in the propagation direction of light, there is an advantage that the fabrication process is facilitated in comparison with the embodiment described hereinabove (refer to FIG. 1A). In particular, in the side-wall grating waveguide type optical modulator and the optical transmitter of the embodiment described hereinabove, alignment of the position of a p-type doped region forming mask formed using a lithography technique upon doping in the p type, the position of an n-type doped region forming mask formed using a lithography technique upon doping in the n type and the position of a side-wall grating forming mask (channel forming mask) formed using a lithography technique upon etching hereinafter described are performed with high accuracy in the fabrication process. In contrast, in the side-wall grating waveguide type optical modulator and the optical transmitter of the modification, since the n-type doped region 2A is provided entirely in the propagation direction of light, alignment of the position of a p-type doped region forming mask formed using a lithography technique upon doping in the p type and the position of a side-wall grating forming mask formed using a lithography technique upon etching hereinafter described (principally, alignment in a direction along the propagation direction of light) may be performed with high accuracy in the fabrication process. Therefore, the side-wall grating waveguide type optical modulator and the optical transmitter of the modification exhibit an advantage that the fabrication process is facilitated in comparison with those of the embodiment described hereinabove.

Further, in the embodiment described hereinabove, the doped region 2X includes the n-type doped region 2A doped in the n type and the p-type doped region 2B doped in the p type, and the doped region 2X and the non-doped region 2Y are provided alternately along the propagation direction of light. Further, the plurality of channels 4 includes the plurality of n-type channels 4A connected to the n-type doped regions 2A and the plurality of p-type channels 4B connected to the p-type doped regions 2B. However, the configuration of the components mentioned is not limited to this.

Figure 9A:
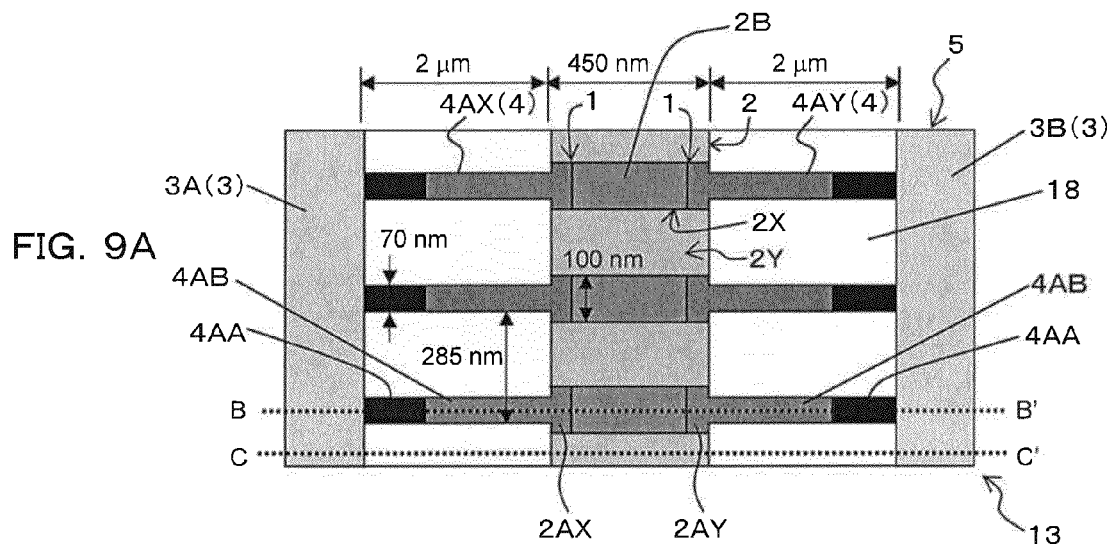
Figure 9B:
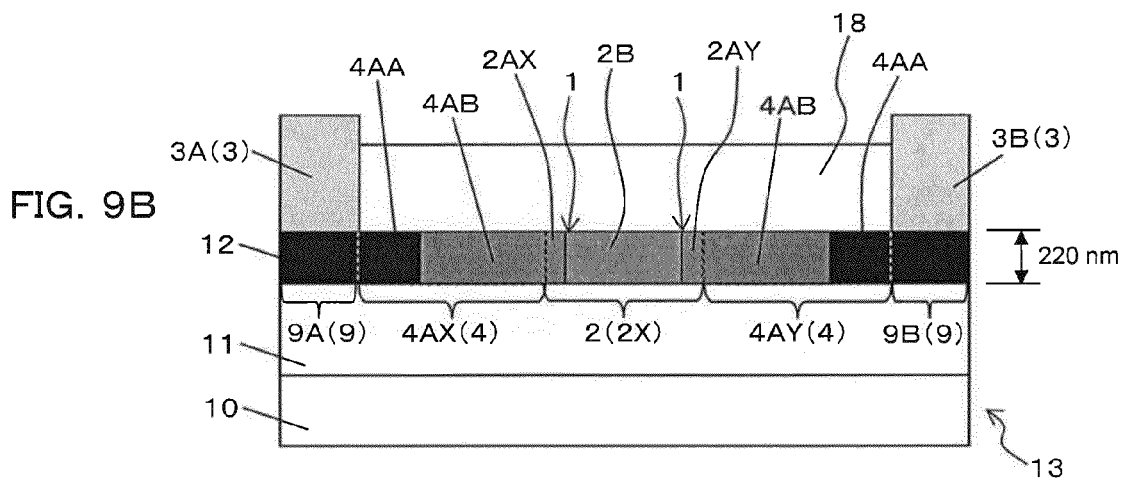
Figure 9C:
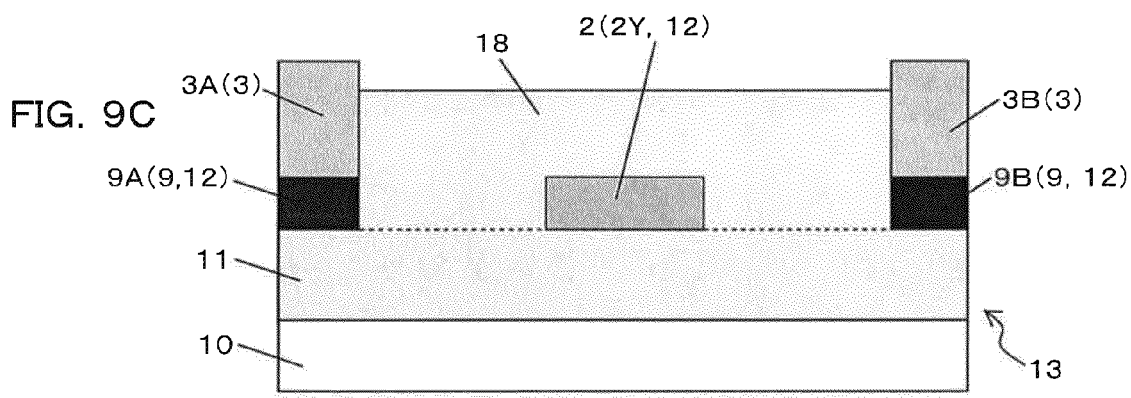

For example, the doped region 2X may include the p-type doped region 2B doped in the p type, and the doped region 2X and the non-doped region 2Y may be provided alternately in the propagation direction of light as depicted in FIGS. 9A to 9C. Further, the plurality of channels 4 may include a plurality of first n-type channels 4AX connected to the one side of the doped regions 2X and a plurality of second n-type channels 4AY connected to the opposite side to the one side of the doped regions 2X. In this case, the plurality of first n-type channels 4AX are made of a semiconductor material doped in the n type, electrically connect the optical waveguide core 2 and the first electrode 3A to each other and are provided in a spaced relationship from each other along the propagation direction of light. Meanwhile, the plurality of second n-type channels 4AY are made of a semiconductor material doped in the n type, electrically connect the optical waveguide core 2 and the second electrode 3B to each other and are provided in a spaced relationship from each other along the propagation direction of light. Especially, preferably the plurality of first n-type channels 4AX are provided periodically in a fixedly spaced relationship from each other in the propagation direction of light, and preferably the plurality of second n-type channels 4AY are provided periodically in a fixedly spaced relations from each other along the propagation direction of light. More particularly, a central region of the optical waveguide core 2 in the widthwise direction may be set as the p-type doped region 2B while opposite sides of the p-type doped region 2B are set as a first n-type doped region 2AX and a second n-type doped region 2AY and besides a first n-type channel 4AX and a second n-type channel 4AY are provided on opposite sides of the optical waveguide core 2. In this case, the first n-type channel 4AX and the second n-type channel 4AY may be formed by doping the regions 4AA on the pads 9A and 9B side in the n type in a high doping concentration of approximately $10^{20}/cm^3$ and doping the region 4AB on the optical waveguide core 2 side in the n type in a low doping concentration of approximately $5\times10^{18}/cm^3$. Further, a central region of the optical waveguide core 2 in the widthwise direction may be set as the p-type doped region 2B doped in the p type in a low doping concentration of approximately $1\times10^{18}/cm^3$ while regions on opposite sides of the central region are set as the first n-type doped region 2AX and the second n-type doped region 2AY doped in the n type in a low doping concentration of the approximately $5\times10^{18}/cm^3$. It is to be noted that this is referred to as second modification. Also with the side-wall grating waveguide type optical modulator and the optical transmitter of the second modification having such a configuration as described above, by applying a voltage between the electrodes 3A and 3B provided on opposite sides of the optical waveguide core 2, the concentration of the carriers at the pn junction portions 1 at which the p-type doped regions 2B and the first n-type doped regions 2AX in the inside of the optical waveguide core 2 are joined together and the pn junction portions 1 at which the p-type doped region 2B and the second n-type doped region 2AY are joined together can be changed, and it is possible to cause the side-wall grating waveguide type optical modulator and the optical transmitter to operate similarly as those in the embodiment described hereinabove. Further, with such a configuration of the second modification as described above, where the doping concentrations are made equal, since the channels (gratings) 4 doped in the n type and exhibiting a lower resistance are used as channels on opposite sides of the optical waveguide core 2, the side-wall grating waveguide type optical modulator and the optical transmitter exhibit an advantage that, in comparison with an alternative case in which the loss is fixed, a lower resistance can be achieved in comparison with that in the embodiment described hereinabove.

In this manner, the n-type channels 4A and the n-type doped regions 2A may be provided on the one side of the optical waveguide core 2 while the p-type channels 4B and the p-type doped regions 2B are provided on the other side and the n-type doped regions 2A and the p-type doped regions 2B are joined together by pn junction similarly as in the embodiment described hereinabove. Or, a central region of the optical waveguide core 2 in the widthwise direction may be set as the p-type doped region 2B while opposite sides of the central region are set as the n-type doped regions 2AX and 2AY and n-type channels 4AX and 4AY are provided on opposite sides of the optical waveguide core 2 to configure an npn structure that includes two pn junction portions 1 similarly as in the second modification. In other words, the channels 4 provided on opposite sides of the optical waveguide core 2 may be doped in different polarities from each other as in the embodiment described hereinabove, or the channels 4 provided on opposite sides of the optical waveguide core 2 may be doped in the same polarity as in the second modification.

Further, while, in the foregoing description of the embodiment, a case in which silicon (Si) is used as the material for configuring the optical waveguide core 2, channels 4 and pads 9 of the optical modulator 5 is taken as an example, the material of them is not limited to this, but a different material may be used. For example, a material such as Ge or SiGe or a material whose crystal can be grown on a GaAs substrate or an InP substrate such as GaInAsP, InGaAs, GaAs or InP may be used. It is to be noted that, while, in the embodiment described above, an optical modulator that uses a free carrier plasma effect in silicon is taken as an example, an optical modulator may be configured otherwise using an electro-optical effect such as a free carrier plasma effect, a Franz Keldysh effect or a quantum confinement Stark effect in the other materials mentioned above.

Further, while, in the embodiment and the modifications described above, the Mach-Zehnder type optical modulator 6 in which the side-wall grating optical waveguide type optical modulator 5 is used as a phase modulator is taken as an example, the application of the side-wall grating waveguide type optical modulator 5 is not limited to this, but also it is possible to apply the side-wall grating waveguide type optical modulator 5 to other optical modulators.

Figure 10:
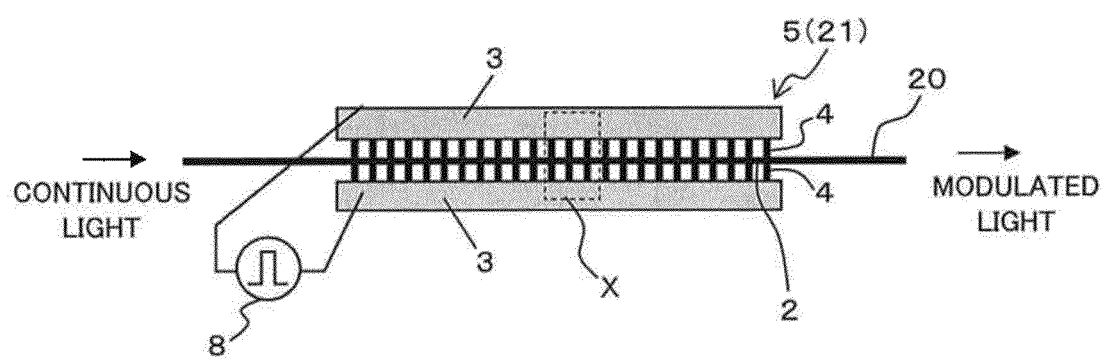
FIG. 10 is a schematic plan view depicting a configuration of an optical modulator (absorption type optical modulator) according to a third modification to the embodiment.

For example, the side-wall grating waveguide type optical modulator 5 may be used as an absorption type optical modulator 21 as depicted in FIG. 10. In this case, modulation of light is performed utilizing a variation of the absorption coefficient of light by a plasma effect of electrons/holes injected in the optical waveguide core 2. Further, in this case, the side-wall grating waveguide type optical modulator 5 is provided not on the two arms 7 (refer to FIG. 3) of such a Mach-Zehnder type interferometer as in the embodiment described hereinabove but on a single waveguide 20 as depicted in FIG. 10. Further, a voltage signal source 8 may be connected to the electrodes 3 provided on the side-wall grating waveguide type optical modulator 5 such that a high frequency voltage as a modulation signal may be applied. Then, by varying the carrier concentration in the inside of the optical waveguide core 2, the absorption coefficient of the optical waveguide core 2 is varied thereby to modulate the intensity of light to be outputted from the optical waveguide core 2. It is to be noted that an enlarged view of a region X surrounded by a broken line in FIG. 10 exhibits a configuration same as the configuration of the side-wall grating waveguide type optical modulator 5 of the embodiment described hereinabove (refer to FIG. 1A) or the configuration of any of the modifications to the embodiment described hereinabove (refer to FIG. 8 or 9A). Further, this is referred to as third modification. The absorption type optical modulator 21 of the third modification having such a configuration as described above exhibits an advantage that the configuration is simplified in comparison with that of the Mach-Zehnder type optical modulator 6. For example, while, in the Mach-Zehnder type optical modulator 6, adjustment of the initial phase difference between the two arms 7 of the Mach-Zehnder interferometer is performed, the absorption type optical modulator 21 exhibits an advantage that such adjustment can be omitted. However, where the side-wall grating waveguide type optical modulator 5 is used to utilize a plasma effect in silicon, generally the resulting modulation of light is greater where the variation of the refractive index is utilized than where the variation of the absorption coefficient is utilized. Therefore, where the side-wall grating waveguide type optical modulator 5 is used in the absorption type optical modulator 21, the modulation efficiency is usually lower than that where the side-wall grating waveguide type optical modulator 5 is used in the Mach-Zehnder type optical modulator 6.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. An optical modulator comprising:
an optical waveguide core made of a semiconductor material;
an electrode; and
a plurality of channels made of a semiconductor material doped in an n type or a p type and electrically connecting the optical waveguide core and the electrode to each other; wherein
the plurality of channels are provided in a spaced relationship from each other along a propagation direction of light;
the optical waveguide core includes a doped region doped in the n type or the p type and a non-doped region, the doped region and the non-doped region being disposed alternately along the propagation direction of light;
each of the plurality of channels is connected to the doped region;
the electrode includes a first electrode and a second electrode provided on opposite sides of the optical waveguide core;
the doped region includes
an n-type doped region doped in the n type, and
a p-type doped region joined to the n type doped region and doped in the p type;
the non-doped region and at least one of the n-type doped region and the p-type doped region are provided alternately along the propagation direction of light; and
the plurality of channels include
a plurality of n-type channels made of a semiconductor material doped in the n type, electrically connecting the optical waveguide core and the first electrode to each other, provided in a spaced relationship from each other in the propagation direction of light and connected to the n-type doped region, and
a plurality of p-type channels made of a semiconductor material doped in the p type, electrically connecting the optical waveguide core and the second electrode to each other, provided in a spaced relationship from each other in the propagation direction of light and connected to the p-type doped region.

2. The optical modulator according to claim 1, wherein the n-type doped region and the non-doped region are provided alternately along the propagation direction of light, and
the p-type doped region and the non-doped region are provided alternately along the propagation direction of light.

3. The optical modulator according to claim 1, wherein the n-type doped region and the non-doped region are provided alternately along the propagation direction of light, and
the p-type doped region is provided successively along the propagation direction of light.

4. The optical modulator according to claim 1, wherein the p-type doped region and the non-doped region are provided alternately along the propagation direction of light, and
the n-type doped region is provided successively along the propagation direction of light.

5. The optical modulator according to claim 1, wherein the plurality of n-type channels are provided periodically in a fixedly spaced relationship from each other along the propagation direction of light, and
the plurality of p-type channels are provided periodically in a fixedly spaced relationship from each other along the propagation direction of light.

6. An optical modulator comprising:
an optical waveguide core made of a semiconductor material;
an electrode; and
a plurality of channels made of a semiconductor material doped in an n type or a p type and electrically connecting the optical waveguide core and the electrode to each other; wherein
the plurality of channels are provided in a spaced relationship from each other along a propagation direction of light;
the optical waveguide core includes a doped region doped in the n type or the p type and a non-doped region, the doped region and the non-doped region being disposed alternately along the propagation direction of light;
each of the plurality of channels is connected to the doped region;

the electrode includes a first electrode and a second electrode provided on opposite sides of the optical waveguide core;

the doped region includes a p-type doped region doped in the p type; and the plurality of channels include a plurality of first n-type channels made of a semiconductor material doped in the n type, electrically connecting the optical waveguide core and the first electrode to each other, provided in a spaced relationship from each other in the propagation direction of light and connected to one side of the doped region, and a plurality of second n-type channels made of a semiconductor material doped in the n type, electrically connecting the optical waveguide core and the second electrode to each other, provided in a spaced relationship from each other in the propagation direction of light and connected to the opposite side to the one side of the doped region.

7. The optical modulator according to claim 6, wherein the plurality of first n-type channels are provided periodically in a fixedly spaced relationship from each other in the propagation direction of light, and the plurality of second n-type channels are provided periodically in a fixedly spaced relationship from each other in the propagation direction of light.

8. An optical modulator comprising:

an optical waveguide core made of a semiconductor material;

an electrode; and a plurality of channels made of a semiconductor material doped in an n type or a p type and electrically connecting the optical waveguide core and the electrode to each other; wherein the plurality of channels are provided in a spaced relationship from each other along a propagation direction of light;

the optical waveguide core includes a doped region doped in the n type or the p type and a non-doped region, the doped region and the non-doped region being disposed alternately along the propagation direction of light;

each of the plurality of channels is connected to the doped region; and the optical waveguide core and the plurality of channels have an equal thickness.

9. An optical transmitter, comprising:

a semiconductor laser that outputs continuous light; and an optical modulator that modulates the continuous light from the semiconductor laser;

the optical modulator including:

an optical waveguide core made of a semiconductor material;

an electrode; and a plurality of channels made of a semiconductor material doped in an n type or a p type and electrically connecting the optical waveguide core and the electrode to each other;

the plurality of channels being provided in a spaced relationship from each other along a propagation direction of light;

the optical waveguide core including a doped region doped in the n type or the p type and a non-doped region, the doped region and the non-doped region being disposed alternately along the propagation direction of light; and each of the plurality of channels being connected to the doped region;

the plurality of channels being provided periodically in a fixedly spaced relationship from each other in the propagation direction of light;

a wavelength of the continuous light outputted from the semiconductor laser being set to a wavelength in the proximity of a band edge on the longer wavelength side of a stop band of a transmission spectrum of the optical modulator.

* * * * *